US012335002B2

United States Patent
Raghavan et al.

(10) Patent No.: US 12,335,002 B2
(45) Date of Patent: Jun. 17, 2025

(54) CALIBRATION APPLICATION FOR MITIGATING MILLIMETER WAVE SIGNAL BLOCKAGE

(71) Applicant: QUALCOMM INCORPORATED, San Diego, CA (US)

(72) Inventors: Vasanthan Raghavan, West Windsor, NJ (US); Sony Akkarakaran, Poway, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 471 days.

(21) Appl. No.: 17/670,190

(22) Filed: Feb. 11, 2022

(65) Prior Publication Data

US 2023/0261709 A1   Aug. 17, 2023

(51) Int. Cl.
*H04B 17/318* (2015.01)
*H04B 7/06* (2006.01)
*H04L 5/00* (2006.01)

(52) U.S. Cl.
CPC ......... *H04B 7/0617* (2013.01); *H04B 7/0626* (2013.01); *H04B 17/318* (2015.01); *H04L 5/0051* (2013.01)

(58) Field of Classification Search
None
See application file for complete search history.

(56) References Cited

U.S. PATENT DOCUMENTS

| | | | |
|---|---|---|---|
| 10,666,342 B1* | 5/2020 | Landis | H04B 17/318 |
| 10,856,191 B1 | 12/2020 | Virtej et al. | |
| 12,047,788 B2* | 7/2024 | Raghavan | G06N 3/096 |
| 2015/0097766 A1* | 4/2015 | Kapur | G06F 3/017 345/156 |
| 2016/0198474 A1* | 7/2016 | Raghavan | H04B 7/0456 370/335 |
| 2018/0287651 A1* | 10/2018 | Fernando | H01Q 1/245 |
| 2019/0253117 A1* | 8/2019 | Raghavan | H04B 7/0834 |
| 2020/0412417 A1* | 12/2020 | Calzolari | H04W 52/245 |
| 2021/0055385 A1* | 2/2021 | Rimini | G01S 7/417 |
| 2021/0096726 A1* | 4/2021 | Faulkner | G06F 3/04883 |
| 2021/0112425 A1* | 4/2021 | Tran | H04W 16/28 |
| 2021/0167911 A1* | 6/2021 | Xiao | H04W 72/0446 |
| 2021/0243293 A1* | 8/2021 | Ökvist | H04B 7/0413 |
| 2022/0014282 A1* | 1/2022 | Bezawada | H04B 17/318 |
| 2022/0095308 A1* | 3/2022 | Ashraf | H04B 7/063 |
| 2022/0149911 A1* | 5/2022 | Li | H04W 74/0833 |
| 2022/0329329 A1* | 10/2022 | Ding | H04L 25/0254 |
| 2022/0394618 A1* | 12/2022 | Yang | H04W 52/0232 |
| 2023/0205371 A1* | 6/2023 | Choe | H03K 17/955 343/861 |

(Continued)

*Primary Examiner* — Nicholas Sloms
(74) *Attorney, Agent, or Firm* — Haynes and Boone, LLP

(57) ABSTRACT

Various aspects of the present disclosure generally relate to wireless communication. In some aspects, a user equipment (UE) performs a training procedure in which it measures a signal strength and gathers information about objects surrounding the UE, such as the location of fingers holding the UE. This information may be used later in order to mitigate signal issues related to the UE environment by different mitigation strategies such as triggering a re-training of beamforming weights, or increasing the number of reference signals used for beam training.

18 Claims, 9 Drawing Sheets

(56) References Cited

U.S. PATENT DOCUMENTS

| | | | |
|---|---|---|---|
| 2023/0256997 A1* | 8/2023 | Lee | G01S 13/42 |
| | | | 701/23 |
| 2023/0269532 A1* | 8/2023 | Ahn | G06N 3/0464 |
| | | | 381/92 |
| 2023/0319656 A1* | 10/2023 | Jung | H04W 48/08 |
| 2024/0088959 A1* | 3/2024 | Lee | H04B 7/0619 |
| 2024/0348356 A1* | 10/2024 | Wang | H04B 7/0626 |

* cited by examiner

CALIBRATION APPLICATION FOR MITIGATING MILLIMETER WAVE SIGNAL BLOCKAGE

TECHNICAL FIELD

This application relates to wireless communication systems, and more particularly to mitigating interference by objects in proximity to a user equipment via a calibration application.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum.

The use of higher frequency bands brings some challenges. The relatively short wavelengths means that objects near a UE, including a hand holding the UE, may materially affect the signal. This may degrade signal quality in ways that have not been problematic previously with longer wavelength communication frequencies. Therefore, there is a need for techniques to mitigate signal degradation from objects near a UE.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of millimeter wave wireless communication comprises performing a training procedure with a software application comprising obtaining a first set of information associated with objects surrounding a user equipment (UE) and obtaining a set of field strength measurements across polarizations and across at least one antenna element of a set of antenna elements associated with the UE and corresponding to the first set of information. The method further comprises obtaining, after the training procedure with the software application, a second set of information associated with objects surrounding the UE. The method further comprises performing a mitigating action based on a comparison between the first set of information and the second set of information, and a correlation between the first set of information and the set of field strength measurements.

In another aspect of the disclosure, a user equipment (UE), comprises a memory, a transceiver, and a processor coupled with the memory and the transceiver and configured, when executing instructions stored on the memory, to cause the UE to perform a training procedure with a software application comprising obtaining a first set of information associated with objects surrounding a user equipment (UE) and obtaining a set of field strength measurements across polarizations and across at least one antenna element of a set of antenna elements associated with the UE and corresponding to the first set of information. The processor is further configured to obtain, after the training procedure with the software application, a second set of information associated with objects surrounding the UE. The processor is further configured to perform a mitigating action based on a comparison between the first set of information and the second set of information, and a correlation between the first set of information and the set of field strength measurements.

In another aspect of the disclosure, a computer-readable medium having program code recorded thereon for execution by a user equipment (UE), the program code comprising code for causing the UE to perform a training procedure with a software application comprising obtaining a first set of information associated with objects surrounding a user equipment (UE) and obtaining a set of field strength measurements across polarizations and across at least one antenna elements of a set of antenna elements associated with the UE and corresponding to the first set of information. The software application further comprising code for causing the UE to obtain, after the training procedure with the software application, a second set of information associated with objects surrounding the UE. The software application further comprising code for causing the UE to perform a mitigating action based on a comparison between the first set of information and the second set of information, and a correlation between the first set of information and the set of field strength measurements.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
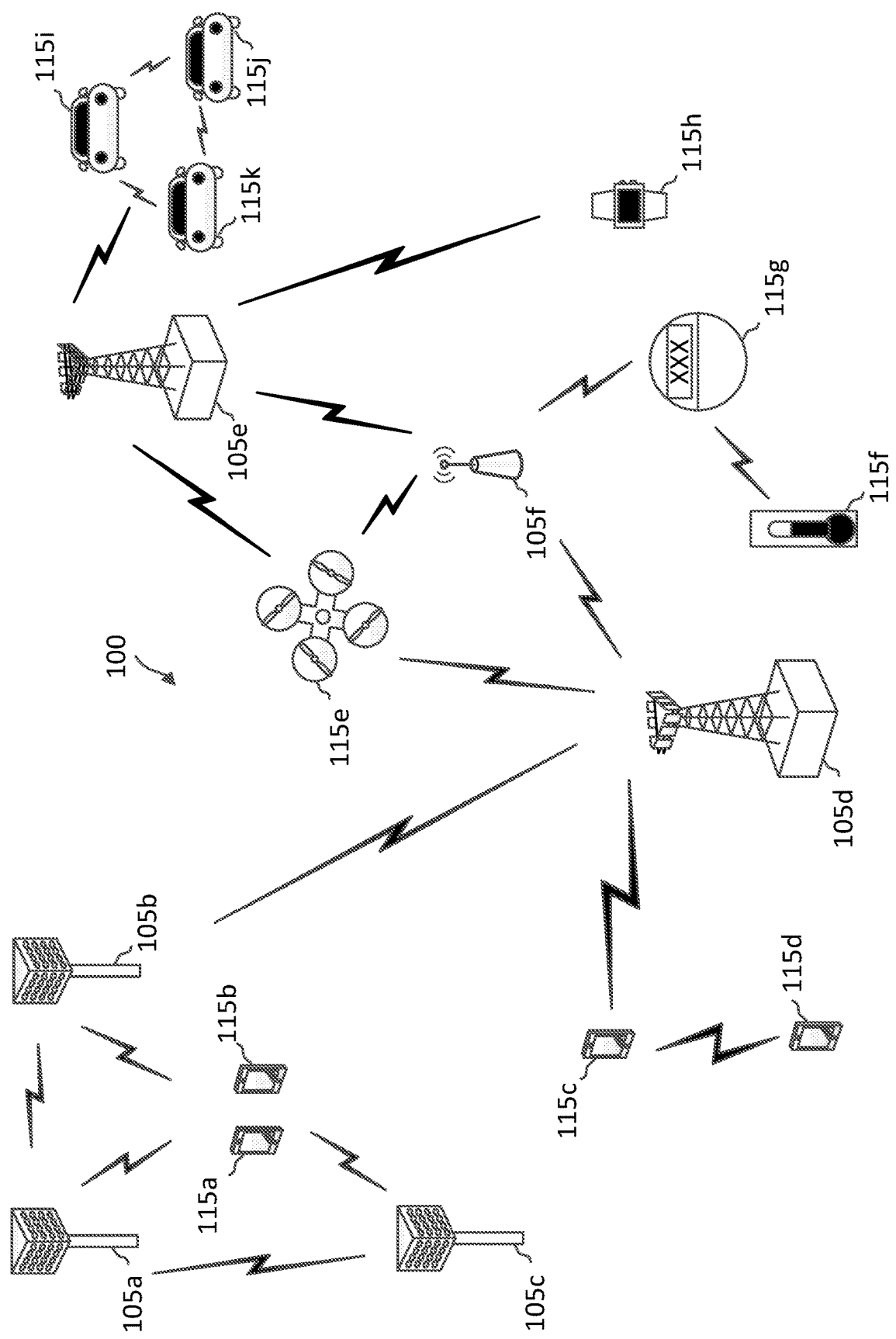
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Aspects of the present disclosure include systems and methods for mitigating millimeter wave (mmWave) signal blockage. A software application (e.g., an over-the-top software calibration application) on a UE may be triggered to run by a BS, or it may run autonomously on the UE based on some configured protocol for generating reports to the BS based on an agreed mechanism. The application (app) may cause the UE to perform a training operation. The training operation may include prompts for a user to hold the UE in different positions, or with different external accessories (e.g., headphones, charging cable, gloves). During this procedure, the UE may make signal measurements, including per-antenna field strength measurements and/or beamformed antenna array measurements. These measurements may be correlated with other measurements which give information about the UE environment. These environmental measurements may include, for example, measurements of finger locations, grip strength, whether a cable is attached, etc. Measurements may be logged and stored on the UE, a BS, or a centralized server. Environmental measurements may be stored and used individually, or may be combined and/or categorized for more convenient processing. For example, environmental measurements may be combined and categorized into a set of configured hand grip states corresponding to different blockage scenarios. These hand grip states may be known a priori as corresponding to certain scenarios. For example, one identified scenario may be a when a user is holding the UE with a loose grip held up to the user's ear. When the app prompts a user to perform different actions with the UE, the prompts may be associated with different predefined hand grip states.

After the training phase, the app may cause the UE to monitor the environment by making the same or similar environmental measurements as made during the training phase. These measurements may be compared to those during the training phase so the UE may determine if the environment is likely to materially affect signal transmission. The inference of a potential signal problem based on the measurements may be a simple comparison of measurements, or may be a more complex comparison of a combination of multiple measurements. For example, a machine learning model may be used with the measurements as inputs, and with an output that indicates the likelihood a signal is affected. Other network information may be used as part of the inference that were not necessarily measured during the training phase. For example, network statistics about upload and download rates may be used to inform the inference.

Once the app on the UE determines that the UE environments may be materially blocking the signal, the UE may perform a mitigating action. This may be done proactively before the UE measures a decline in signal strength. To mitigate the blockage, the app may cause the UE to, for example, trigger a retraining of beam weights for beamforming. In some aspects, the beam weight training occurs using the antenna subarray already in use. In some aspects, if the beam training fails to find a sufficiently strong signal with any beam weights, the UE may attempt to find a beam that has a stronger received signal using a different antenna subarray. In another example, the UE may increase transmit power up to some limit. In yet another example, the UE may indicate to a BS information associated with the environmental measurements. For example, a bit may be set indicating a potential issue with received signal strength. In response, the BS may increase the periodicity or quantity of CSI-RS transmissions to the UE and/or increase allowed transmit power for the UE.

There are a variety of benefits realized by utilizing aspects of the present disclosure. By monitoring for changes in the grip or other environmental details, a UE may respond to obstructions quicker than the typical time frame for updating beam weights. As a result, a UE may be able to communicate more reliably, and be able to more fully utilize millimeter wave communication with higher bandwidths. By training the UE with multiple hand grips or other scenarios, the UE may learn how to react in different situations to improve signal quality.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may be designed to enable a wide range of use cases. While in some examples a network 100 may utilize monolithic base stations, there are a number of other architectures which may be used to perform aspects of the present disclosure. For example, more distributed architectures are presented and discussed with reference to FIGS. 2-3. For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a Near-Real Time (Near-RT) RAN Intelligent Controller (RIC), a Non-Real Time (Non-RT) RIC, integrated access and backhaul (IAB) node, a relay node, a sidelink node, etc.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE 115*e*, which may be airborne. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-action-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such asV2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, UEs 115 may make measurements or otherwise obtain information about their surrounding environment which may have a material affect on signal strength. For example, measurements may be made to determine the locations of fingers relative to the UE 115, the force with which the UE 115 is held, or whether an external accessory is present. These measurements may be correlated with signal strength measurements so that the UE 115 may determine which environmental characteristics are known to cause a material reduction in signal strength. A reduction in signal strength may occur, for example, when one or more fingers are held in near proximity or directly over an antenna subarray on the UE 115 being used for communication between the UE 115 and a BS 105. This may be more apparent when using mm wave communication, as the wavelength of the beams are short enough that they are more affected by relatively small objects on the order of millimeters in dimension. A UE 115 may make these measurements during a training phase of an application on the UE 115. Then when the UE later encounters similar environments characteristics that it observed during the training phase were correlated with decreased signal strength, the UE 115 may perform some mitigation procedure proactively. For example, beam signal strength may be increased, beam weights retrained, and/or increased CSI-RS signals may be used to train beam weights more accurately.

In some aspects, the measurements correlations and processing is done locally on the UE 115. In other aspects, information gathered using the application on the UE 115 is processed by a BS 105 or a centralized server. For example, a centralized server may gather information measured by one or more UEs 115 and use it to train a machine learning algorithm. The machine learning algorithm may be used to identify patterns in the measured data in order to infer when signal strength may decrease given a set of environmental measurements.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

After establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

Figure 2:
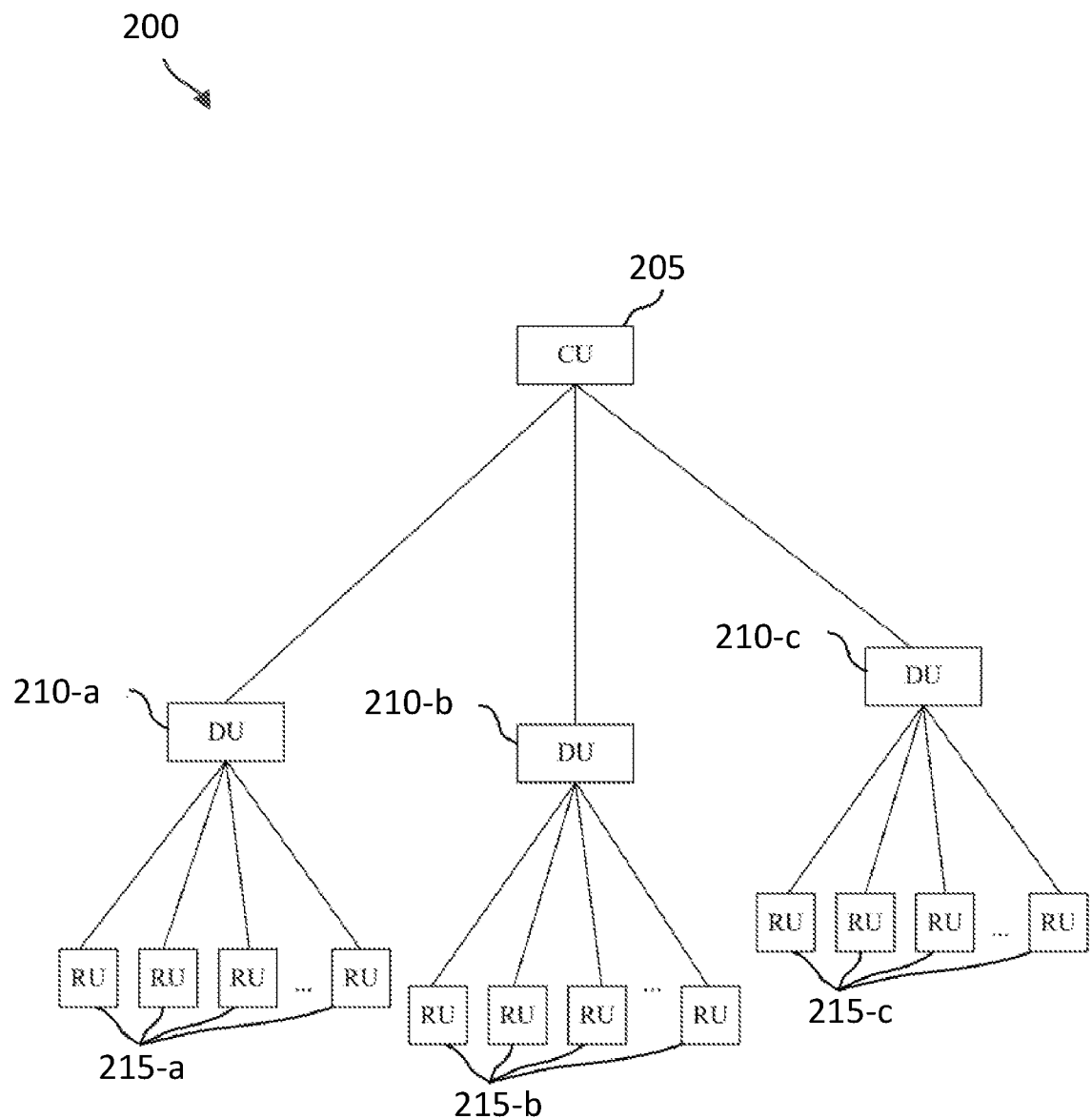
FIG. 2 illustrates an example portion of a wireless communications system that supports RU sharing techniques in wireless communications according to some aspects of the present disclosure.

FIG. 2 illustrates an example of a disaggregated RAN architecture 200 that supports remote unit (RU) sharing techniques in wireless communications in accordance with aspects of the present disclosure. In some examples, the disaggregated RAN architecture 200 may implement aspects of wireless communications system 100. One or more of the elements discussed with respect to RAN architecture 200 may be a network entity which performs one or more functions described with reference to FIGS. 2-9.

In the example of FIG. 2, a central unit (CU) 205 may be interconnected with multiple distributed units (DUs) 210. For example, control plane (CP) functions of CU 205 may be handled at a CU-CP component that communicates with DUs 210 via a F1-C interface, and user plane (UP) functions of CU 205 may be handled at a CU-UP component that communicates with DUs 210 via a F1-U interface. Such a disaggregated RAN architecture, along with standardized interfaces among main RAN components (e.g., the F1-C and F1-U interfaces, Xn interfaces, NG interfaces, and the like) may provide an open RAN (O-RAN) environment that provides mobile network operators an opportunity to diversify their network suppliers. Further, such an architecture may provide enhanced network redundancy, where multiple DUs 210 may be connected to CU 205 (or multiple CUs), and multiple RUs 215 may be connected to one or multiple DUs 210.

Each RU 215 may be a separate cell or a number of RUs 215 can belong to the same cell. In accordance with various aspects as discussed herein, one or more RUs 215 may be shared RUs 215 that may be interconnected with DUs 210 of multiple different mobile network operators.

Figure 3:
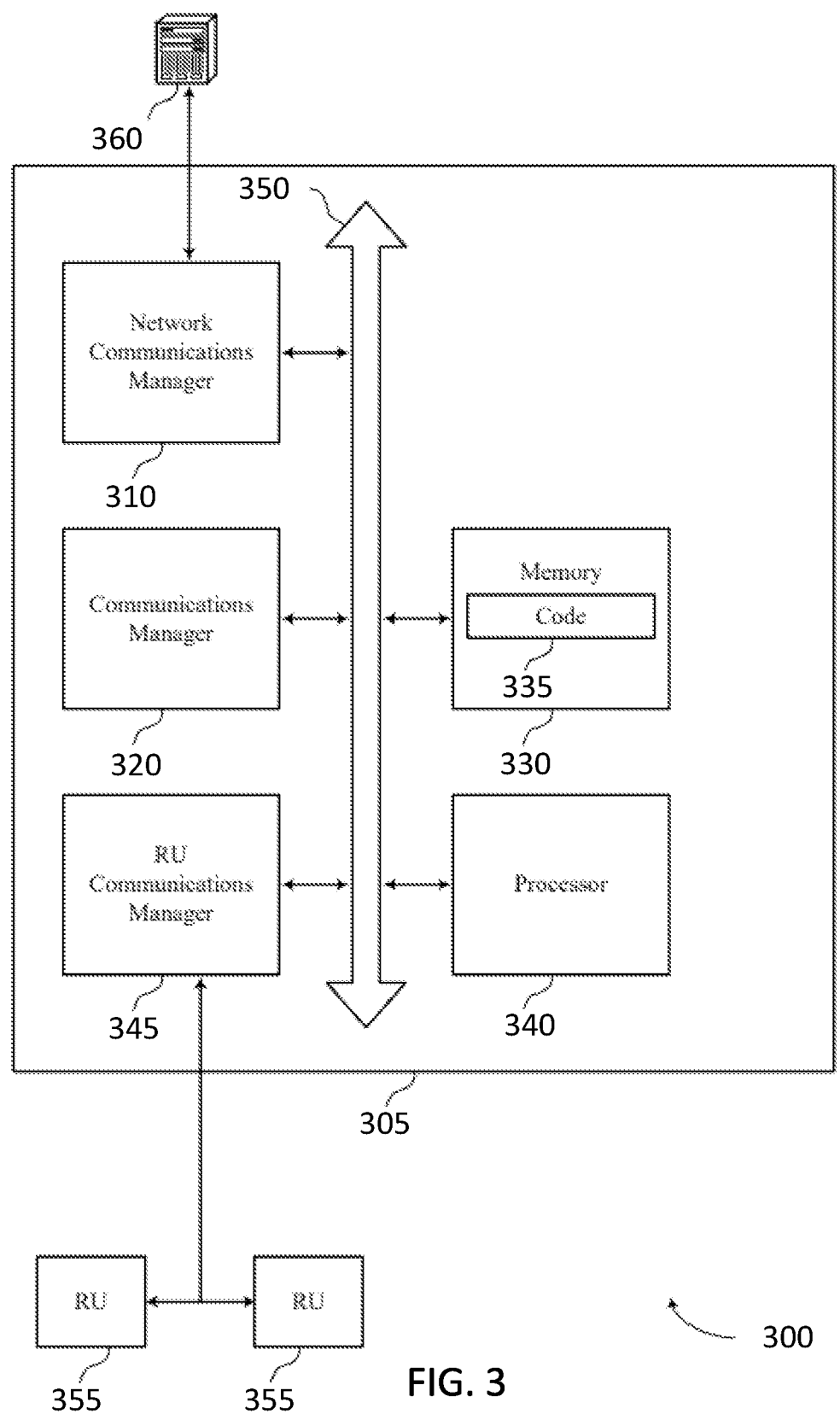
FIG. 3 illustrates a diagram of a system including a device that supports RU sharing techniques in wireless communications according to some aspects of the present disclosure.

FIG. 3 shows a diagram of a system 300 including a device 305 that supports RU sharing techniques in wireless communications in accordance with aspects of the present disclosure. The device 305 may communicate with one or more RUs 355. The device 305 may include components for bi-directional voice and data communications including components for transmitting and receiving communications, such as a communications manager 320, a network communications manager 310, a memory 330, code 335, a processor 340, and a RU communications manager 345. These components may be in electronic communication or otherwise coupled (e.g., operatively, communicatively, functionally, electronically, electrically) via one or more buses (e.g., a bus 350). One or more of the components of system 300 may perform functions as described herein with reference to FIGS. 2-9, for example functions described as performed by a base station or network entity.

The network communications manager 310 may manage communications with a core network 360 (e.g., via one or more wired backhaul links). For example, the network communications manager 310 may manage the transfer of data communications for client devices, such as one or more UEs 115.

The memory 330 may include RAM and ROM. The memory 330 may store computer-readable, computer-executable code 335 including instructions that, when executed by the processor 340, cause the device 305 to perform various functions described herein. The code 335 may be stored in a non-transitory computer-readable medium such as system memory or another type of memory. In some cases, the code 335 may not be directly executable by the processor 340 but may cause a computer (e.g., when compiled and executed) to perform functions described herein. In some cases, the memory 330 may contain, among other things, a BIOS which may control basic hardware or software operation such as the interaction with peripheral components or devices.

The processor 340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 340 may be configured to operate a memory array using a memory controller. In some other cases, a memory controller may be integrated into the processor 340. The processor 340 may be configured to execute computer-readable instructions stored in a memory (e.g., the memory 330) to cause the device 305 to perform various functions (e.g., functions or tasks supporting RU sharing techniques in wireless communications). For example, the device 305 or a component of the device 305 may include a processor 340 and memory 330 coupled to the processor 340, the processor 340 and memory 330 configured to perform various functions described herein.

The RU communications manager 345 may manage communications with RUs 355, and may include a controller or scheduler for controlling communications with UEs 115 in cooperation with RUs 355. For example, the RU communications manager 345 may coordinate scheduling for transmissions to UEs 115. In some examples, the RU communications manager 345 may provide an F1 interface within a wireless communications network technology to provide communication with RUs 355.

The communications manager 320 may support wireless communications at a network node in accordance with examples as disclosed herein. For example, the communications manager 320 may be configured as or otherwise support a means for transmitting, to a first RU, a request for a wireless resource configuration for a first time period. The communications manager 320 may be configured as or otherwise support a means for transmitting, to a second RU, an interference inquiry associated with the wireless resource configuration for the first time period. The communications manager 320 may be configured as or otherwise support a means for receiving, from the second RU, a response to the interference inquiry. The communications manager 320 may be configured as or otherwise support a means for transmitting, based on the response to the interference inquiry, a payload to the first RU for transmission during the first time period.

By including or configuring the communications manager 320 in accordance with examples as described herein, the device 305 may support techniques for RU sharing in which DUs of different MNOs may access wireless resources of other MNOs, which may increase efficiency of resource usage while provide for competition and innovation among different MNOs, may increase the reliability of wireless communications, decrease latency, and enhance user experience.

In some examples, the communications manager 320 may be configured to perform various operations (e.g., receiving, monitoring, transmitting) using or otherwise in cooperation with other components. Although the communications manager 320 is illustrated as a separate component, in some examples, one or more functions described with reference to the communications manager 320 may be supported by or performed by the processor 340, the memory 330, the code 335, or any combination thereof. For example, the code 335 may include instructions executable by the processor 340 to cause the device 305 to perform various aspects of RU sharing techniques in wireless communications as described herein, or the processor 340 and the memory 330 may be otherwise configured to perform or support such operations.

Figure 4:
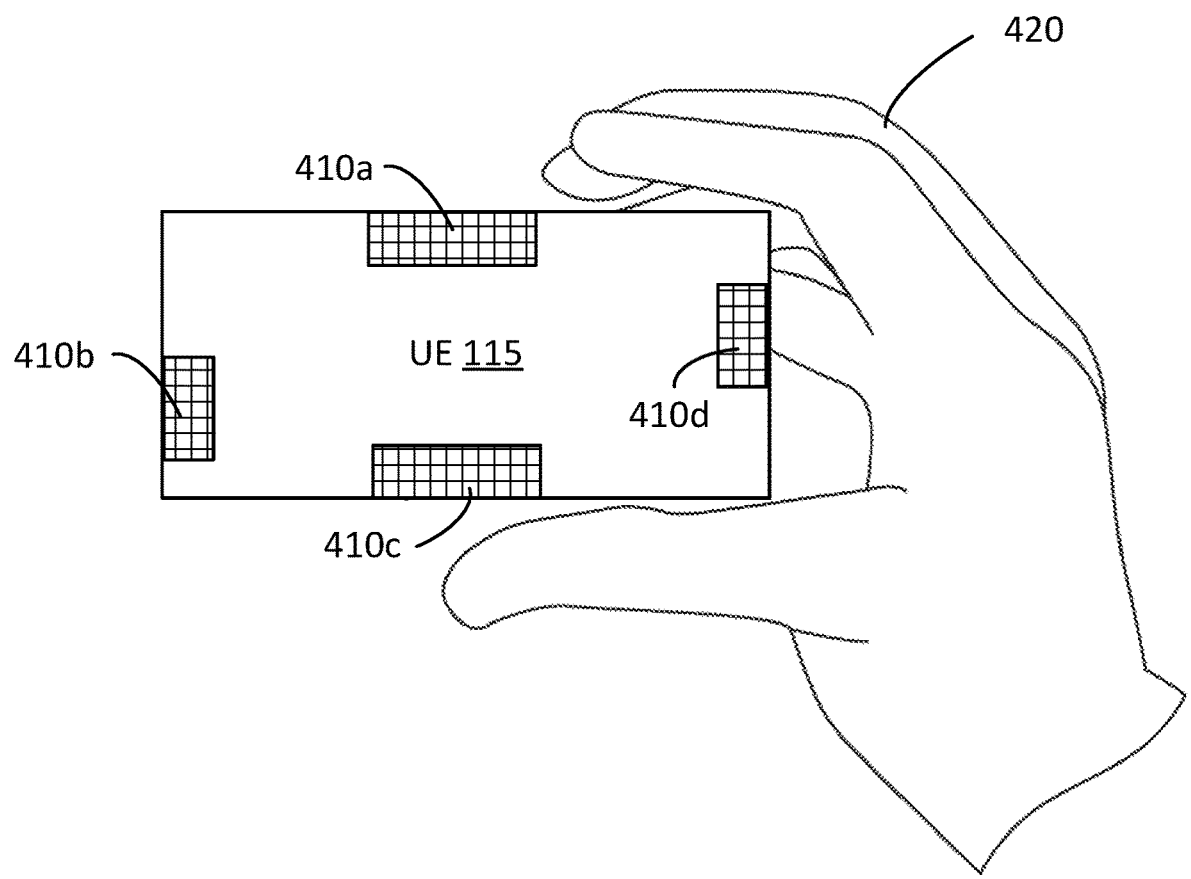
FIG. 4 illustrates an exemplary user equipment being held by a hand.

FIG. 4 illustrates an exemplary user equipment being held by a hand. As illustrated, the UE 115 has four different antenna subarrays 410. Each antenna subarray 410 may be comprised of an array of antenna elements that may be used together for beamforming. The antennas may be used for both transmit (uplink) and receive (downlink). Depending on the antenna subarray being used, the hand 420 may block transmit and receive signals. For example, signals may be unaffected by hand 420 for antenna subarray 410b. Signals at antenna subarray 410 may be affected by the proximity of the fingers which may partially block the signal. Likewise, antenna subarrays 410c and 410d may each be affected to some degree by hand 420. At any one time, UE 115 may use a single antenna subarray 410, or multiple antenna subarrays 410 simultaneously. Blockage of signals by objects such as fingers may be more pronounced for high frequency signaling such as millimeter wave (mmWave) or higher communication. As such, mitigation of blockage may typically be used in the context of mmWave signals.

Measurements may be made by UE 115 in order to determine characteristics of hand 420. For example, antenna subarray 410a may use frequency-modulated continuous-wave (FMCW) radar measurements to determine distances to different fingers or portions of a finger. Other sensors may make measurements, such as LiDAR measurements of finger locations and/or pressure/capacitive sensor measurements of grip strength. While not illustrated, other items in proximity to UE 115 may cause blockage or otherwise materially affect uplink and downlink transmission. For example, the presence of gloves or jewelry on hand 420, a phone case on UE 115, a charging cable attached to UE 115, etc.

Figure 5:
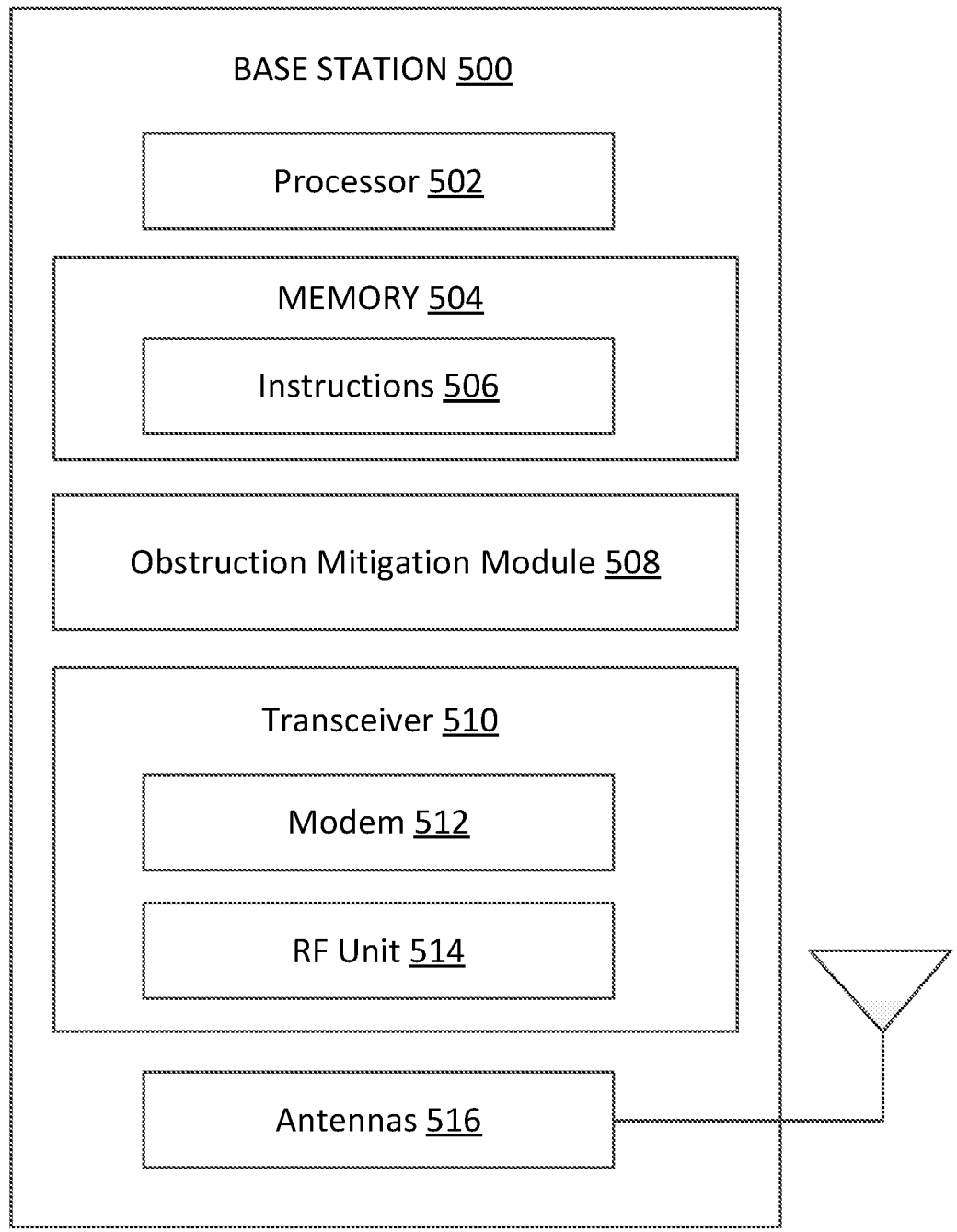
FIG. 5 illustrates a block diagram of an exemplary base station (BS) according to some aspects of the present disclosure.

FIG. 5 is a block diagram of an exemplary BS 500 according to some aspects of the present disclosure. The BS 500 may be a BS 105 as discussed in FIG. 1. As shown, the BS 500 may include a processor 502, a memory 504, an obstruction mitigation module 508, a transceiver 510 including a modem subsystem 512 and a RF unit 514, and one or more antennas 516. These elements may be coupled with one another. The term "coupled" may refer to directly or indirectly coupled or connected to one or more intervening elements. For instance, these elements may be in direct or indirect communication with each other, for example via one or more buses.

BS 500 may be monolithic, or may be dis aggregated, comprising of multiple component parts which together perform the functions of a BS 500. For example, BS 500 may be composed of a remote unit (RU), distributed unit (DU), and/or central unit (CU) as discussed with reference to FIGS. 2-3. Functions described as being performed by BS 500 may be performed by one or more of these disaggregated sub-components. For example, a function described a being performed by BS 500 may be performed solely by a RU, or in some aspects it may be performed jointly by a DU and a RU. Additionally, physical components of BS 500 may be disaggregated. For example, processor 502 may be composed of a processor in a DU and a processor in a CU.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 4 and 7-9. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The obstruction mitigation module 508 may be implemented via hardware, software, or combinations thereof. For example, the obstruction mitigation module 508 may be implemented as a processor, circuit, and/or instructions 506 stored in the memory 504 and executed by the processor 502. In some examples, the obstruction mitigation module 508 can be integrated within the modem subsystem 512. For example, the obstruction mitigation module 508 can be implemented by a combination of software components (e.g., executed by a DSP or a general processor) and hardware components (e.g., logic gates and circuitry) within the modem subsystem 512. The obstruction mitigation module 508 may communicate with one or more components of BS 500 to implement various aspects of the present disclosure, for example, aspects of FIGS. 4 and 7-9.

The obstruction mitigation module 508 may send a message to a UE 115 to start a training procedure for obstruction mitigation. The obstruction mitigation module may transmit CSI-RS signals to the UE 115 so that it may make signal strength measurements during the training procedure, and also for beam training. Measurements made by a UE 115 as part of the obstruction mitigation application may be received by the obstruction mitigation module 508 and either stored locally in memory 504, or may be transmitted to a centralized server. Measurements may be stored unprocessed, or they may be quantized and categorized into predefined grip states.

After the training procedure, the obstruction mitigation module may receive an indication from the UE 115 that there may be an obstruction affecting received signal strength. In response, obstruction mitigation module 508 may perform a mitigation action. For example, mitigation actions may include increasing transmit power for the transmit beam associated with the UE 115. Another mitigation action may be to increase the number of CSI-RSs that are transmitted to the UE 115 so as to improve the UE beam training.

In some aspects, obstruction mitigation module 508 may be involved in the inference of an obstruction based on measurements by the UE. For example, measurements made by UE 115 may be received by mitigation module 508, which may then infer based on the measurements that there is an obstruction, thereby triggering a mitigation action.

As shown, the transceiver 510 may include the modem subsystem 512 and the RF unit 514. The transceiver 510 can be configured to communicate bi-directionally with other devices, such as the UEs 115, 215 and/or BS 500 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., RRC configurations, PDCCH DCIs, CSI-RS, etc.) from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 500 to enable the BS 500 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices and provide the received data messages for processing and/or demodulation at the transceiver 510. The transceiver 510 may provide the demodulated and decoded data (e.g., PUSCH data, etc.) to the obstruction mitigation module 508 for processing. The antennas 516 may include multiple antennas of similar or different designs in order to sustain multiple transmission links.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
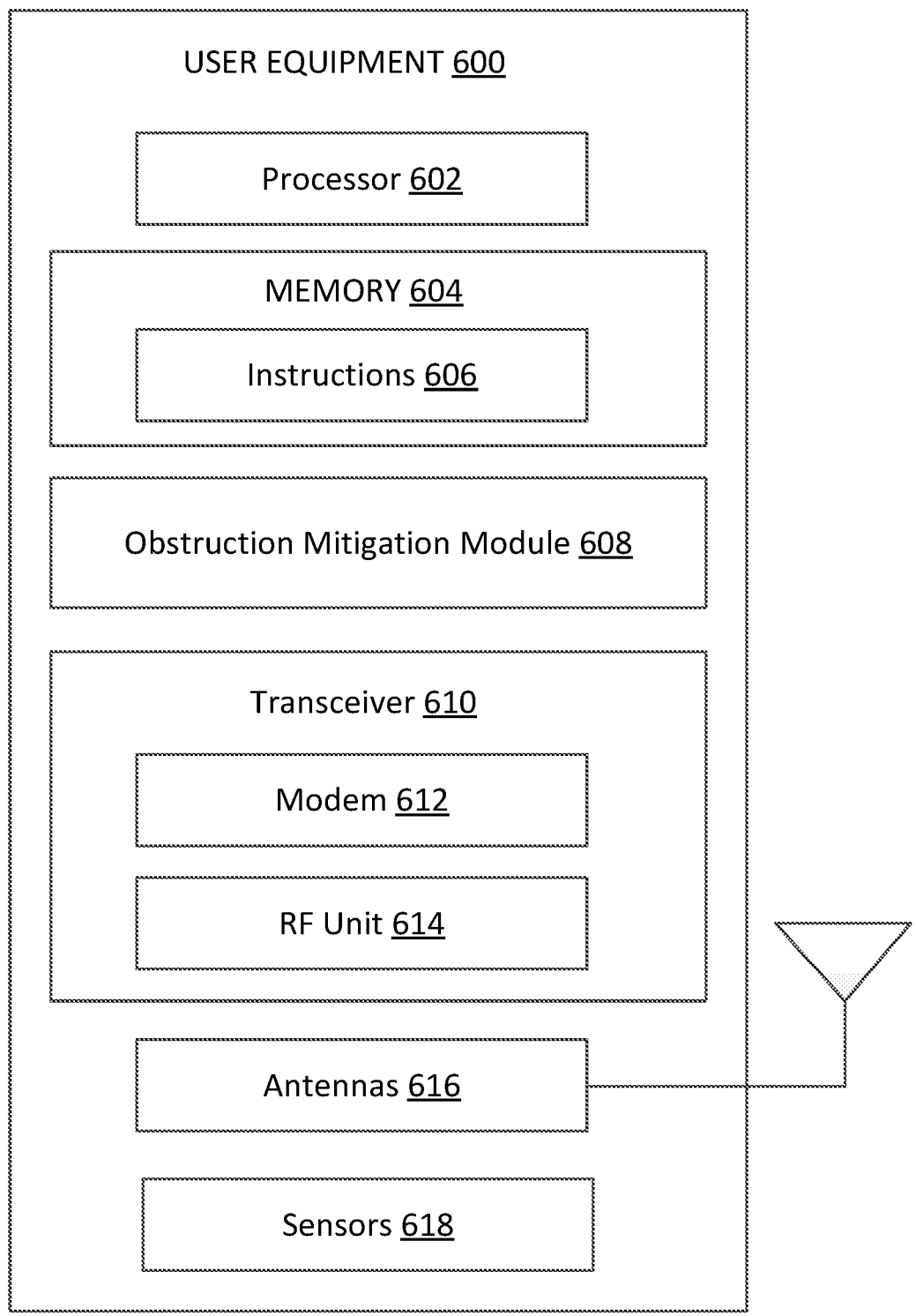
FIG. 6 illustrates a block diagram of an exemplary user equipment (UE) according to some aspects of the present disclosure.

FIG. 6 is a block diagram of an exemplary UE 600 according to some aspects of the present disclosure. The UE 600 may be a UE 115 as discussed above in FIG. 1. As shown, the UE 600 may include a processor 602, a memory 604, an obstruction mitigation module 608, a transceiver 610 including a modem subsystem 612 and a radio frequency (RF) unit 614, one or more antennas 616, and sensors 618. These elements may be coupled with one another. The term "coupled" may refer to directly or indirectly coupled or connected to one or more intervening elements. For instance, these elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to a UE 115 in connection with aspects of the present disclosure, for example, aspects of FIGS. 4 and 7-9. Instructions 606 may also be referred to as code, which may include any type of computer-readable statements.

The obstruction mitigation module 608 may be implemented via hardware, software, or combinations thereof. For example, the obstruction mitigation module 608 may be implemented as a processor, circuit, and/or instructions 606 stored in the memory 604 and executed by the processor 602.

In some aspects, the obstruction mitigation module 608 may be configured to perform actions described with reference to FIGS. 4 and 7-9. For example, obstruction mitigation module 608 may begin a training procedure either autonomously, at the request of a user, or by an indication from a BS 105.

Obstruction mitigation module 608 may receive a reference signal from a BS 105. This may be, for example, a channel state information reference signal (CSI-RS). Obstruction mitigation module 608 measures the reference signal strength either per antenna element based (i.e., electric field strength) or as a beamformed signal strength measurement such as reference signal received power (RSRP). Field strength measurements may, in some aspects, be made across multiple polarizations in order to determine impact based on polarization. In some aspects, rather than measure a received reference signal, obstruction mitigation module 608 may transmit a reference signal (e.g., SRS) to a BS 105 which makes the measurement and reports the measurement to the UE 600.

Obstruction mitigation module 608 may perform environmental measurements associated with UE 600. These measurements are intended to identify conditions surrounding UE 600 that may materially affect uplink and downlink signals. For example, obstruction mitigation module 608 may measure finger positions relative to antenna subarrays. This may be accomplished, for example, through the use of frequency-modulated continuous-wave (FMCW) radar measurements. Antenna subarrays may transmit an FMCW signal and based on the response, obstruction mitigation module 608 may determine some information about finger placement. Finger positions may also be made by using additional sensors 618 such as one or more LiDAR sensors or inferred using a machine learning model rather than directly measured. The machine learning model may be trained based on measurements performed by the UE, and/or using a database of measurements compiled from other UEs. Sensors 618 in UE 600 may also be used to measure the force with which UE 600 is being held (i.e., grip strength).

A finger touching UE 600 near an antenna subarray may affect the signals more, for example, when the fingers are gripping UE 600 tighter, as described with reference to FIG. 4. Sensors 618 used to make the force measurement may, for example, be one or more piezoelectric pressure sensors. Sensors 618 may be used to measure other characteristics of the UE 600 environment.

Other environmental measurements made by the obstruction mitigation module 608 may include determining that a cable (e.g. a charging cable or headphones) is connected to the phone. Information about the type of cable, and the status of the signaling (e.g., whether the phone is charging via the cable) may be included in the information gathered. Additionally, measurements are not limited to fingers, but other external accessories/objects including gloves, jewelry, and phone cases. Presence of these items may in some aspects be directly measured, or in other aspects may be inferred. Inferences may be learned by obstruction mitigation module 608 by correlating measurements with the app's prompts for the user. For example, the app may prompt the user to hold the phone with a phone case, and then later without a phone case. Sensor measurements during each of those phases may be compared to determine which characteristics may be used to infer the presence of a phone case. Environmental measurements may be made close in time to the measurement of the reference signal described above so that the measured signal strength may be correlated with the environmental measurements.

Environmental measurements may be stored and used individually or may be combined and/or categorized for more convenient processing. For example, obstruction mitigation module 608 may have a set of configured hand grip states corresponding to different blockage scenarios. A combination of one or more sensor measurements may be categorized into one of these quantized hand grip states, and the reference signal measurement may be associated with that hand grip state rather than the individual measurements. These hand grip states may be known a priori as corresponding to certain scenarios. For example, one identified scenario may be a when a user is holding UE 600 with a loose grip held up to the user's ear. Another identified scenario may be the UE 600 plugged into a charging cable and resting on a table. These are exemplary scenarios to show that different "grip states" may be categorized with some knowledge of what the environment of UE 600 is, and these states may be quantified, described, and/or configured before the measurements are made. In some aspects, the quantized grip states are abstract, and it is left unknown by the network devices how the measurements are reflected in the environment.

The reference signal measurement and the environments measurements described above may be part of the training phase of an application performed by obstruction mitigation module 608. The app may prompt the user to perform certain actions while measurements are being made, which may correspond to different grip states. For example, obstruction mitigation module 608 may prompt the user to hold UE 600 in different positions or connect a cable. The training process, may include a number of prompts, and may make a number of measurements associated with each prompt.so that there is a series of measurements.

The measurements may be logged by obstruction mitigation module 608. The information may be stored locally on UE 600 in memory 604, may be transmitted to BS 105, and/or may be stored at a centralized machine learning or data collection server. Logged data may include data measured during one training phase, or may accumulate over multiple training phases. Additionally, use of the logged data described below may include similar data collected from other UEs 600 or 115. For example, a centralized server may aggregate information from multiple UEs 115 to create a richer data set.

After the training phase, obstruction mitigation module 608 may make environmental measurements periodically. Based on these measurements, and how they correlate to measurements made during the training phase, obstruction mitigation module 608 may infer a potential signal issue (i.e., signal blockage). This may be done, for example, by comparing the environmental measurements made during the training phase to those collected after the training phase. If the environmental measurements are sufficiently similar to measurements during the training phase that were correlated with a loss in signal strength, then obstruction mitigation module 608 may determine that this is a potential signal issue. Obstruction mitigation module 608 may make this inference without making a measurement of a reference signal.

The comparison of environmental measurements may be performed in a number of ways. In one example, each type of measurement (e.g., finger position and grip strength) are associated with a threshold determined based on the measurements made during the training phase by the UE 600 or some other device (e.g., a BS 105 or a centralized server). Obstruction mitigation module 608 may consider each measurement individually with each threshold, where any measurement above the respective threshold is considered indicative of a problem. In another example, the determination may be made based on a more complex combination of the measurements. For example, the measurements made after the training phase may be inputs to a machine learning model that was trained based on training measurements. The output of the machine learning module may be used to indicate a potential signal issue. The machine learning model may, for example, be stored on a central server which is used to log the data as described above. In some aspects, the determination is based on more than the measurements made by US 600. For example, BS 105 or a centralized server may use additional network information that is available such as network traffic statistics, including rates at which data is uploaded and/or downloaded to UE 115. Other network information may include synchronization signal blocks (SSBs), and/or serving cell identifying information. Some network information, for example, may be useful for inferring potential signal blockage as they may be correlated with frequency dependent signal loss.

In reaction to a determination of a potential signal obstruction, obstruction mitigation module 608 may perform a mitigation procedure. A variety of different mitigation procedures may be used either individually or in combination. For example, obstruction mitigation module 608 may trigger retraining of weights for beamforming. In some aspects, the beam weight training occurs using the antenna subarray already in use. In some aspects, if the beam training fails to find a sufficiently strong signal with any beam weights, obstruction mitigation module 608 may attempt to find a beam that has a stronger received signal using a different antenna subarray. In another example, obstruction mitigation module 608 may increase transmit power up to some limit. In yet another example, obstruction mitigation module 608 may indicate to a BS 105 information associated with the environmental measurements. For example, a bit may be set indicating a potential issue with received signal strength based on the environmental measurements. In response, UE 600 may receive CSI-RS with increased periodicity or quantity from the BS 105. By receiving CSI-RS more often, beam weights may be learned more reliably by obstruction mitigation module 608.

As shown, the transceiver 610 may include the modem subsystem 612 and the RF unit 614. The transceiver 610 can be configured to communicate bi-directionally with other devices, such as the BSs 105 and 300.

The modem subsystem 612 may be configured to modulate and/or encode the data from the memory 604, the obstruction mitigation module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PUSCH data, SRS, etc.) or of transmissions originating from another source such as a UE 115, a BS 105, or an anchor. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 600 to enable the UE 600 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., RRC configurations, PDCCH DCIs, CSI-RS, etc.) to the obstruction mitigation module 608 for processing. The antennas 616 may include multiple antennas of similar or different designs in order to sustain multiple transmission links.

In an aspect, the UE 600 can include multiple transceivers 610 implementing different RATs (e.g., NR and LTE). In an aspect, the UE 600 can include a single transceiver 610 implementing multiple RATs (e.g., NR and LTE). In an aspect, the transceiver 610 can include various components, where different combinations of components can implement different RATs.

Figure 7:
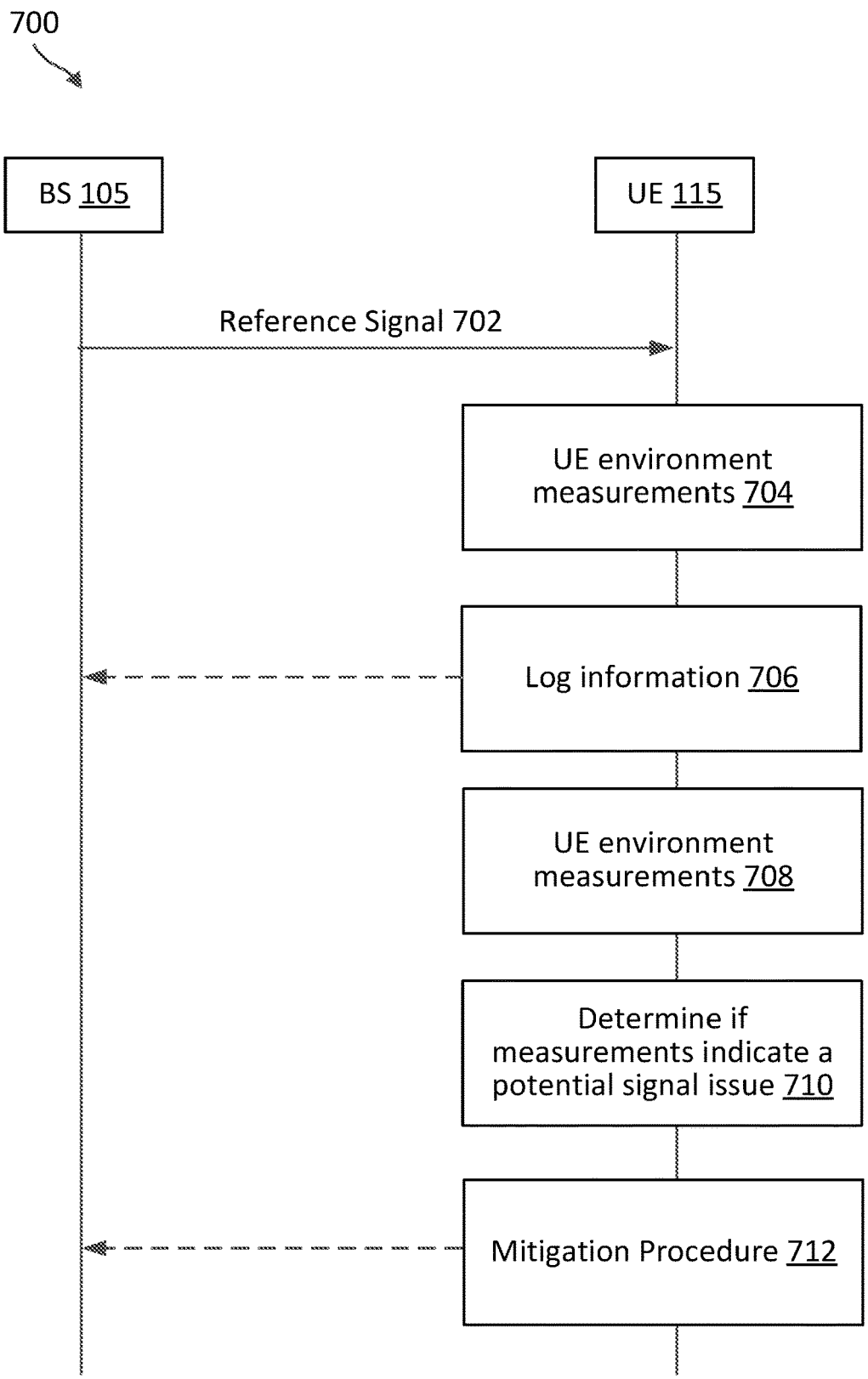
FIG. 7 illustrates a communication diagram according to some aspects of the present disclosure.

FIG. 7 illustrates an exemplary communication protocol diagram 700 according to some aspects of the present disclosure. Aspects of the communication protocol diagram 700 may be performed by wireless networks, such as the network 100. In this regard, a BS 105 and UE 115 may perform functions of the communication protocol diagram 700. In some aspects, the BS 105 may utilize one or more components, such as the processor 502, the memory 504, the obstruction mitigation module 508, the transceiver 510, the modem 512, and the one or more antennas 516 shown in FIG. 5. The actions described as being performed by the BS 105 may also be performed by other network entities, such as by one or more components of a disaggregated base station. The UE 115 may utilize one or more components, such as the processor 602, the memory 604, the obstruction mitigation module 608, the transceiver 610, the modem 612, the one or more antennas 616, and sensors 618 shown in FIG. 6. As illustrated, the method 700 includes a number of enumerated actions, but aspects of the FIG. 7 may include additional actions before, after, and in between the enumerated actions. In some aspects, one or more of the enumerated actions may be omitted or performed in a different order.

Aspects of the communication protocol diagram 700 performed by UE 115 may be performed via a software application (app). The app may be an over-the-top software program which a user installs on the UE as prompted by the service provider or otherwise. In some aspects, the app may be triggered to run by BS 105, or it may run autonomously on UE 115 based on some configured protocol for generating reports to BS 105 based on an agreed mechanism.

At action 702, UE 115 receives a reference signal from BS 105. This may be, for example, a channel state information reference signal (CSI-RS). UE 115 measures the reference signal strength. The measurement may be per antenna element based (i.e., electric field strength) or a beamformed signal strength measurement such as reference signal received power (RSRP). Field strength measurements may, in some aspects, be made across multiple polarizations in order to determine impact based on polarization. In some aspects, the signal strength is measured via a reference signal such as a sounding reference signal (SRS) transmitted by the UE 115 to the BS 105. In this case the BS 105 makes the measurement and reports the measurement to the UE 115.

At action 704, UE environmental measurements are performed by UE 115. These measurements are intended to identify conditions surrounding UE 115 that may materially affect uplink and downlink signals. For example, UE 115 may measure finger positions relative to antenna subarrays. This may be accomplished, for example, through the use of frequency-modulated continuous-wave (FMCW) radar measurements. Antenna subarrays may transmit an FMCW signal and based on the response, UE 115 may determine some information about finger placement. Finger positions may also be made by using one or more LiDAR sensors, or inferred using a machine learning model rather than directly measured. Sensors in UE 115 may also be used to measure the force with which UE 115 is being held (i.e., grip strength). A finger touching UE 115 near an antenna subarray may affect the signals more, for example, when the fingers are gripping UE 115 tighter. A sensor used to make the force measurement may, for example, be a piezoelectric pressure sensor.

Other environmental measurements made by the UE 115 may include determining that a cable (e.g. a charging cable or headphones) is connected to the phone. Information about the type of cable, and the status of the signaling (e.g., whether the phone is charging via the cable) may be included in the information gathered at this action. Additionally, measurements are not limited to fingers, but other external accessories/objects including gloves, jewelry, and phone cases. Presence of these items may in some aspects be directly measured, or in other aspects may be inferred. Inferences may be learned by UE 115 by correlating measurements with the app's prompts for the user. For example, the app may prompt the user to hold the phone with a phone case, and then later without a phone case. Sensor measurements during each of those phases may be compared to determine which characteristics may be used to infer the presence of a phone case. Environmental measurements may be made close in time to the measurement of the reference signal at action 702 so that the measured signal strength may be correlated with the environmental measurements.

Environmental measurements may be stored and used individually or may combined and/or categorized for more convenient processing. For example, UE 115 and/or BS 105 may have a set of configured hand grip states corresponding to different blockage scenarios. A combination of one or more sensor measurements may be categorized into one of these quantized hand grip states, and the reference signal measurement may be associated with that hand grip state rather than the individual measurements. These hand grip states may be known a priori as corresponding to certain scenarios. For example, one identified scenario may be a when a user is holding UE 115 with a loose grip held up to the user's ear. Another identified scenario may be the UE 115 plugged into a charging cable and resting on a table. These are exemplary scenarios to show that different "grip states" may be categorized with some knowledge of what the environment of UE 115 is, and these states may be quantified, described, and/or configured before the measurements are made. In some aspects, the quantized grip states are abstract, and it is left unknown by the network devices how the measurements are reflected in the environment.

Actions 702 and 704 may be part of a training phase of the app. This training phase may be initiated by BS 105, initiated automatically by UE 115, or may be initiated by user request. The app may prompt the user to perform certain actions while measurements are being made, which may correspond to different grip states. For example, UE 115 may prompt the user to hold UE 115 in different positions or connect a cable. During the training process, actions 702 and 704 may be repeated several times so that there is a series of measurements.

At action 706, UE 115 logs the information gathered at actions 702 and 704. The information may be stored locally on UE 115, may be transmitted to BS 105, and/or may be stored at a centralized machine learning or data collection server. Logged data may include data measured during one training phase or may accumulate over multiple training phases. Additionally, use of the logged data described below may include similar data collected from other UEs 115. For example, a centralized server may aggregate information from multiple UEs 115 to create a richer data set.

At action 708, UE 115 makes UE environmental measurements outside of a training phase. These measurements may be made periodically while the phone is powered on, or in active use. Environmental measurements made at this action are similar or the same as those measured at action 704.

At action 710, UE 115 determines if measurements made at action 708 indicate a potential signal issue. This may be done, for example, by comparing the environmental measurements from action 708 to those collected during the training phase. If the environmental measurements are sufficiently similar to measurements during the training phase that were correlated with a loss in signal strength, then UE 115 may determine that this is a potential signal issue. UE 115 may make this inference without making a measurement of a reference signal.

The comparison of environmental measurements may be performed in several ways. In one example, each type of measurement (e.g., finger position and grip strength) are associated with a threshold determined based on the measurements made during the training phase by the UE 115 or some other device (e.g., a BS 105 or a centralized server). UE 115 may consider each measurement individually with each threshold, where any measurement above the respective threshold is considered indicative of a problem. In another example, the determination may be made based on a more complex combination of the measurements. For example, the measurements made at action 708 may be inputs to a machine learning model that was trained based on prior measurements including measurements made at actions 702 and 704. The output of the machine learning module may be used to indicate a potential signal issue. The machine learning model may, for example, be stored on a central server which is used to log the data at action 706. In some aspects, the determination is based on more than the measurements at actions 702 and 704. For example, BS 105 or a centralized server may use additional network information that is available such as network traffic statistics, including rates at which data is uploaded and/or downloaded to UE 115.

At action 712, UE 115 performs a mitigation procedure. This may be done in reaction to a determination made in action 710. A variety of different mitigation procedures may be used either individually or in combination. For example, UE 115 may trigger retraining of weights for beamforming. In some aspects, the beam weight training occurs using the antenna subarray already in use. In some aspects, if the beam training fails to find a sufficiently strong signal with any beam weights, UE 115 may attempt to find a beam that has a stronger received signal using a different antenna subarray. In another example, UE 115 may increase transmit power up to some limit. In yet another example, UE 115 may indicate to BS 105 information associated with the environmental measurements. For example, a bit may be set indicating a potential issue with received signal strength based on the determination at action 710. In response, BS 105 may increase the periodicity or quantity of CSI-RS transmissions to UE 115. By transmitting CSI-RS more often, beam weights may be learned more reliably by UE 115. BS 105 may also increase transmit power in response.

Figure 8:
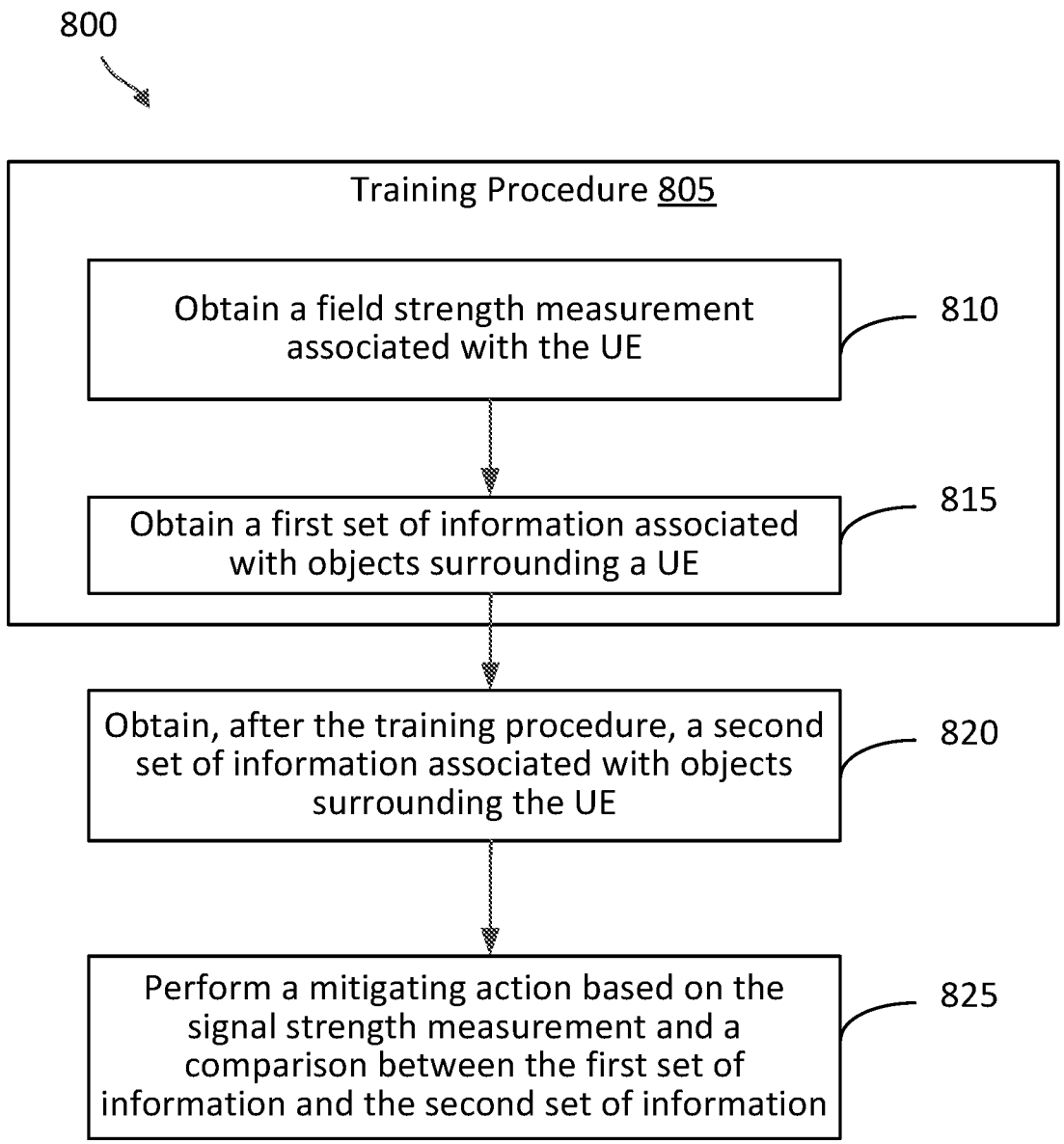
FIG. 8 illustrates a diagram of an exemplary method performed by a UE according to some aspects of the present disclosure.

FIG. 8 is a flowchart of a method 800 according to some aspects of the present disclosure. The method 800 may be performed by a UE, such as a UE 115 or 600. In this regard the UE 115 may utilize one or more components, such as the processor 602, the memory 604, the obstruction mitigation module 608, the transceiver 610, the modem 612, the one or more antennas 616, and sensors 618 shown in FIG. 6. As illustrated, the method 800 includes a number of enumerated actions, but aspects of the method 800 may include additional actions before, after, and in between the enumerated actions. In some aspects, one or more of the enumerated actions may be omitted or performed in a different order.

Training procedure 805 includes at least the actions performed in blocks 810 and 815. In some aspects, training procedure 805 may include more actions performed by the UE 115. Portions of training procedure 805 may be repeated several times before the remaining blocks.

At block 810, UE 115 obtains a field strength measurement associated with the UE. This may be, for example, a measurement of a CSI-RS from a BS 105. UE 115 measures the reference signal field strength either per antenna element based (i.e., electric field strength) or a beamformed signal strength across an array of antenna elements such as reference signal received power (RSRP). Field strength measurements may, in some aspects, be made across multiple polarizations in order to determine impact based on polarization. In some aspects, the signal strength is measured via a reference signal such as a sounding reference signal (SRS) transmitted by the UE 115 to the BS 105. In this case the BS 105 makes the measurement and reports the measurement to the UE 115.

At block 815, UE 115 obtains a first set of information associated with objects surrounding UE 115. These measurements are intended to identify conditions surrounding UE 115 that may materially affect uplink and downlink signals. For example, UE 115 may measure finger positions relative to antenna subarrays. This may be accomplished, for example, through the use of frequency-modulated continuous-wave (FMCW) radar measurements. Antenna subarrays may transmit an FMCW signal and based on the response, UE 115 may determine some information about finger placement. Finger positions may also be made by using one or more LiDAR sensors or inferred using a machine learning model rather than directly measured. Sensors in UE 115 may also be used to measure the force with which UE 115 is being held (i.e., grip strength). A finger touching UE 115 near an antenna subarray may affect the signals more, for example, when the fingers are gripping UE 115 tighter. A sensor used to make the force measurement may, for example, be a piezoelectric pressure sensor.

Other environmental measurements made by the UE 115 may include determining that a cable (e.g., a charging cable or headphones) is connected to the phone. Information about the type of cable, and the status of the signaling (e.g., whether the phone is charging via the cable) may be included in the information gathered at this action. Additionally, measurements are not limited to fingers, but other external accessories/objects including gloves, jewelry, and phone cases. Presence of these items may in some aspects be directly measured, or in other aspects may be inferred. Inferences may be learned by UE 115 by correlating measurements with the app's prompts for the user. For example, the app may prompt the user to hold the phone with a phone case, and then later without a phone case. Sensor measurements during each of those phases may be compared to determine which characteristics may be used to infer the presence of a phone case. Environmental measurements may be made close in time to the measurement of the reference signal at block 810 so that the measured signal strength may be correlated with the environmental measurements.

Environmental measurements may be stored and used individually or may combined and/or categorized for more convenient processing. For example, UE 115 and/or BS 105 may have a set of configured hand grip states corresponding to different blockage scenarios. A combination of one or more sensor measurements may be categorized into one of these quantized hand grip states, and the reference signal measurement may be associated with that hand grip state rather than the individual measurements. These hand grip states may be known a priori as corresponding to certain scenarios. For example, one identified scenario may be a when a user is holding UE 115 with a loose grip held up to the user's ear. Another identified scenario may be the UE 115 plugged into a charging cable and resting on a table. These are exemplary scenarios to show that different "grip states" may be categorized with some knowledge of what the environment of UE 115 is, and these states may be quantified, described, and/or configured before the measurements are made. In some aspects, the quantized grip states are abstract, and it is left unknown by the network devices how the measurements are reflected in the environment.

At block 820, UE 115 obtains, after the training procedure, a second set of information associated with objects surrounding the UE. These measurements may be made periodically while the phone is powered on, or in active use. Environmental measurements made at this block are similar or the same as those measured during training procedure 805. UE 115 may use these measurements to infer a potential signal issue. This may be done, for example, by comparing the environmental measurements from block 815 to those collected during the training phase. If the environmental measurements are sufficiently similar to measurements during the training procedure 805 that were correlated with a loss in signal strength, then UE 115 may determine that this is a potential signal issue. UE 115 may make this inference without making a measurement of a reference signal.

The comparison of environmental measurements may be performed in a number of ways. In one example, each type of measurement (e.g., finger position and grip strength) are associated with a threshold determined based on the measurements made during the training procedure 805 by the UE 115 or some other device (e.g., a BS 105 or a centralized server). UE 115 may consider each measurement individually with each threshold, where any measurement above the respective threshold is considered indicative of a problem. In another example, the determination may be made based on a more complex combination of the measurements. For example, the measurements made at block 820 may be inputs to a machine learning model that was trained based on prior measurements including measurements made during training procedure 805. The output of the machine learning module may be used to indicate a potential signal issue. The machine learning model may, for example, be stored on a central server which is used to log the data. In some aspects, the determination is based on more than the measurements described above. For example, BS 105 or a centralized server may use additional network information that is available such as network traffic statistics, including rates at which data is uploaded and/or downloaded to UE 115.

At block 825, UE 115 performs a mitigating action based on the signal strength measurement and a comparison between the first set of information and the second set of information. This may be done in reaction to an inference of a potential signal obstruction. A variety of different mitigation procedures may be used either individually or in combination. For example, UE 115 may trigger retraining of weights for beamforming. In some aspects, the beam weight training occurs using the antenna subarray already in use. In some aspects, if the beam training fails to find a sufficiently strong signal with any beam weights, UE 115 may attempt to find a beam that has a stronger received signal using a different antenna subarray. In another example, UE 115 may increase transmit power up to some limit. In yet another example, UE 115 may indicate to BS 105 information associated with the environmental measurements. For example, a bit may be set indicating a potential issue with received signal strength based on the inference. In response, BS 105 may increase the periodicity or quantity of CSI-RS transmissions to UE 115. By transmitting CSI-RS more often, beam weights may be learned more reliably by UE 115. BS 105 may also increase transmit power in response.

Figure 9:
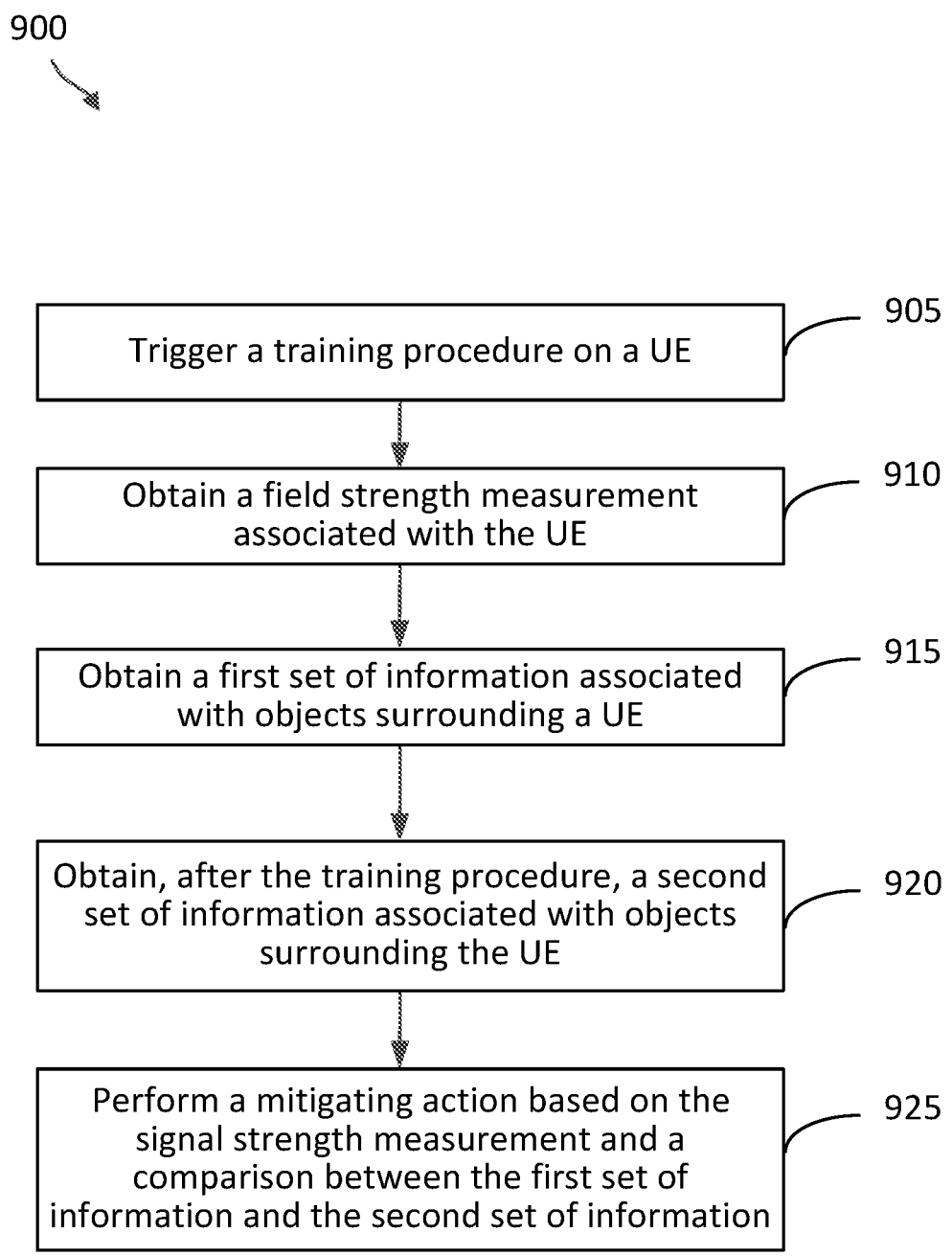
FIG. 9 illustrates a diagram of an exemplary method performed by a network entity according to some aspects of the present disclosure.

FIG. 9 is a flowchart of a method 900 according to some aspects of the present disclosure. The method 900 may be performed by a network entity, such as a BS 105 or 500, or a CU 205, DU 210, or RU 215. For simplicity of discussion, the method will be described as performed by a BS 105. In this regard the BS 105 may utilize one or more components, such as the processor 502, the memory 504, the obstruction mitigation module 508, the transceiver 510, the modem 512, and the one or more antennas 516 shown in FIG. 5. As illustrated, the method 900 includes a number of enumerated actions, but aspects of the method 900 may include additional actions before, after, and in between the enumerated actions. In some aspects, one or more of the enumerated actions may be omitted or performed in a different order.

At block 905, BS 105 triggers a training procedure on a UE 115. For example, the UE 115 may have an app which use used for mitigating antenna obstructions, which may be triggered by a BS 105. BS 105 may trigger the procedure based on a message from the UE 115.

At block 910, BS 105 obtains a field strength measurement associated with the UE 115. This may be, for example, a measurement of a CSI-RS as transmitted by the BS 105.

UE 115 measures the reference signal field strength either per antenna element based (i.e., electric field strength) or a beamformed signal strength across an array of antenna elements such as reference signal received power (RSRP). Field strength measurements may, in some aspects, be made across multiple polarizations in order to determine impact based on polarization. In some aspects, the signal strength is measured via a reference signal such as a sounding reference signal (SRS) transmitted by the UE 115 to the BS 105. In this case the BS 105 makes the measurement and may report the measurement to the UE 115.

At block 915, BS 105 obtains a first set of information associated with objects surrounding UE 115. UE 115 may make the direct measurements and report the information to BS 105, whereas in other aspects, UE 115 performs these functions locally without reporting measurements to BS 105. The reporting may include the raw measurements or may quantize and/or combine the measurement into predefined hand grip states. These measurements are intended to identify conditions surrounding UE 115 that may materially affect uplink and downlink signals.

Other environmental measurements made by the UE 115 and received in a report by BS 105 (in aspects where BS 105 receives a report) may include determining that a cable (e.g., a charging cable or headphones) is connected to the phone. Additionally, measurements are not limited to fingers, but other external accessories/objects including gloves, jewelry, and phone cases. Presence of these items may in some aspects be directly measured, or in other aspects may be inferred. Inferences may be learned by BS 105 by correlating measurements with the app's prompts for the user. For example, the app may prompt the user to hold the phone with a phone case, and then later without a phone case. Sensor measurements during each of those phases may be compared to determine which characteristics may be used to infer the presence of a phone case. Environmental measurements may be made close in time to the measurement of the reference signal at block 910 so that the measured signal strength may be correlated with the environmental measurements.

Environmental measurements may be stored and used individually or may combined and/or categorized for more convenient processing. For example, BS 105 may have a set of configured hand grip states corresponding to different blockage scenarios. A combination of one or more sensor measurements may be categorized into one of these quantized hand grip states, and the reference signal measurement may be associated with that hand grip state rather than the individual measurements. These hand grip states may be known a priori as corresponding to certain scenarios. For example, one identified scenario may be a when a user is holding UE 115 with a loose grip held up to the user's ear. Another identified scenario may be the UE 115 plugged into a charging cable and resting on a table. These are exemplary scenarios to show that different "grip states" may be categorized with some knowledge of what the environment of UE 115 is, and these states may be quantified, described, and/or configured before the measurements are made. In some aspects, the quantized grip states are abstract, and it is left unknown by the network devices how the measurements are reflected in the environment.

At block 920, BS 105 obtains, after the training procedure, a second set of information associated with objects surrounding the UE. Environmental measurements made at this block are similar or the same as those measured during block 915. BS 105 may use these measurements to infer a potential signal issue. This may be done, for example, by comparing the environmental measurements from block 915 to those collected during block 920. If the environmental measurements are sufficiently similar to measurements during the training procedure that were correlated with a loss in signal strength, then BS 105 may determine that this is a potential signal issue. BS 105 may make this inference without making a measurement of a reference signal. In some aspects, UE 115 performs these functions independently of BS 105.

The comparison of environmental measurements may be performed in a number of ways. In one example, each type of measurement (e.g., finger position and grip strength) are associated with a threshold determined based on the measurements made by BS 105. BS 105 may consider each measurement individually with each threshold, where any measurement above the respective threshold is considered indicative of a problem. In another example, the determination may be made based on a more complex combination of the measurements. For example, the measurements made at block 920 may be inputs to a machine learning model that was trained based on prior measurements including measurements made during block 915. The output of the machine learning module may be used to indicate a potential signal issue. The machine learning model may, for example, be stored on a central server which is used to log the data. In some aspects, the determination is based on more than the measurements described above. For example, BS 105 or a centralized server may use additional network information that is available such as network traffic statistics, including rates at which data is uploaded and/or downloaded to UE 115.

At block 925, BS 105 performs a mitigating action based on the signal strength measurement and a comparison between the first set of information and the second set of information. This may be done in reaction to an inference of a potential signal obstruction. A variety of different mitigation procedures may be used either individually or in combination. For example, BS 105 increase antenna transmit power up to some limit. In another example, BS 105 may, either based on its own inference, or based on a report from the UE 115, increase the periodicity or quantity of CSI-RS transmissions to UE 115. By transmitting CSI-RS more often, beam weights may be learned more reliably by UE 115.

Further aspects of the present disclosure include the following clauses:

Clause 1. A method of millimeter wave wireless communication comprising:
  performing a training procedure with an software application comprising:
    obtaining a first set of information associated with objects surrounding a user equipment (UE); and
    obtaining a set of field strength measurements across polarizations and across at least one antenna elements of a set of antenna elements associated with the UE and corresponding to the first set of information;
  obtaining, after the training procedure with the software application, a second set of information associated with objects surrounding the UE; and
  performing a mitigating action based on a comparison between the first set of information and the second set of information, and a correlation between the first set of information and the set of field strength measurements.

Clause 2. The method of clause 1, wherein the software application is triggered to run by one of:
  a network entity; or
  a configured protocol on the UE for generating autonomous reports to the network entity.

Clause 3. The method of any of clauses 1-2, further comprising:
  determining that the first set of information is associated with a hand grip state from a set of hand grip states pre-defined by the software application.
Clause 4. The method of any of clauses 1-3, wherein:
  the first set of information comprises at least one of:
  a first grip strength measurement;
  a first set of finger locations relative to the set of antenna elements;
  a first indication of whether a cable is connected to the UE; or a first indication of whether an external accessory is in proximity of the UE, and
  the second set of information comprises at least one of:
  a second grip strength measurement;
  a second set of finger locations relative to the set of antenna elements;
  a second indication of whether the cable is connected to the UE; or
  a second indication of whether an external accessory is in proximity of the UE.
Clause 5. The method of clause 4, further comprising:
  measuring the first set of finger locations and the second set of finger locations with a respective set of at least one of:
  frequency-modulated continuous-wave (FMCW) radar measurements; or lidar measurements.
Clause 6. The method of any of clauses 1-5, further comprising:
  performing the mitigating action further based on at least one of:
  a first set of synchronization signal blocks (SSBs); or
  serving cell identifying information.
Clause 7. The method of any of clauses 1-6, wherein the mitigating action comprises:
  changing one or more beamforming weights for communications as part of a beam training procedure.
Clause 8. The method of clause 7, wherein the mitigating action comprises:
  increasing a periodicity or quantity of a set of a channel state information reference signals (CSI-RSs) for the beam training procedure.
Clause 9. The method of any of clauses 1-8, wherein:
  the performing the mitigating action is based on an output of a machine learning (ML) algorithm, and
  the output of the ML algorithm is based at least in part on the first set of information, the second set of information, and the set of field strength measurements.
Clause 10. A user equipment (UE), comprising:
  a memory;
  a transceiver; and
  a processor coupled with the memory and the transceiver and configured, when executing instructions stored on the memory, to cause the UE to:
  perform a training procedure with an software application comprising:
    obtaining a first set of information associated with objects surrounding a user equipment (UE); and
    obtaining a set of field strength measurements across polarizations and across at least one antenna elements of a set of antenna elements associated with the UE and corresponding to the first set of information;
  obtain, after the training procedure with the software application, a second set of information associated with objects surrounding the UE; and
  perform a mitigating action based on a comparison between the first set of information and the second set of information, and a correlation between the first set of information and the set of field strength measurements.
Clause 11. The UE of clause 10, wherein the software application is triggered to run by one of:
  a network entity; or
  a configured protocol on the UE for generating autonomous reports to the network entity.
Clause 12. The UE of any of clauses 10-11, wherein the processor is further configured to:
  determine that the first set of information is associated with a hand grip state from a set of hand grip states pre-defined by the software application.
Clause 13. The UE of any of clauses 10-12, wherein:
  the first set of information comprises at least one of:
  a first grip strength measurement;
  a first set of finger locations relative to the set of antenna elements;
  a first indication of whether a cable is connected to the UE; or
  a first indication of whether an external accessory is in proximity of the UE, and
  the second set of information comprises at least one of:
  a second grip strength measurement;
  a second set of finger locations relative to the set of antenna elements;
  a second indication of whether the cable is connected to the UE; or
  a second indication of whether an external accessory is in proximity of the UE.
Clause 14. The UE of clause 13, wherein the processor is further configured to:
  measure the first set of finger locations and the second set of finger locations with a respective set of at least one of:
  frequency-modulated continuous-wave (FMCW) radar measurements; or lidar measurements.
Clause 15. The UE of any of clauses 10-14, wherein the processor is further configured to:
  perform the mitigating action further based on at least one of:
  a first set of synchronization signal blocks (SSBs); or
  serving cell identifying information.
Clause 16. The UE of any of clauses 10-15, wherein the mitigating action comprises:
  changing one or more beamforming weights for communications as part of a beam training procedure.
Clause 17. The UE of clause 16, wherein the mitigating action comprises:
  increasing a periodicity or quantity of a set of a channel state information reference signals (CSI-RSs) for the beam training procedure.
Clause 18. The UE of any of clauses 10-17, wherein:
  the performing the mitigating action is based on an output of a machine learning (ML) algorithm, and
  the output of the ML algorithm is based at least in part on the first set of information, the second set of information, and the set of field strength measurements.
Clause 19. A computer-readable medium having program code recorded thereon for execution by a user equipment (UE), the program code comprising:
  code for causing the UE to perform a training procedure with an software application comprising:
    obtaining a first set of information associated with objects surrounding a user equipment (UE); and
    obtaining a set of field strength measurements across polarizations and across at least one antenna elements of a set of antenna elements associated with the UE and corresponding to the first set of information;

code for causing the UE to obtain, after the training procedure with the software application, a second set of information associated with objects surrounding the UE; and code for causing the UE to perform a mitigating action based on a comparison between the first set of information and the second set of information, and a correlation between the first set of information and the set of field strength measurements.

Clause 20. The computer-readable medium of clause 19, wherein the mitigating action comprises:

performing a beamforming training procedure; and changing beamforming weights based on the beamforming training procedure.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of millimeter wave wireless communication comprising:

performing a training procedure with a software application comprising:

prompting a user to hold a user equipment (UE) in a hand grip state from a set of hand grip states predefined by the software application;

obtaining a first set of information associated with objects surrounding the UE, wherein the first set of information is indicative of the hand grip state; and obtaining a set of field strength measurements across polarizations and across at least one antenna element of a set of antenna elements associated with the UE and corresponding to the hand grip state;

obtaining, after the training procedure with the software application, a second set of information associated with objects surrounding the UE; and performing a mitigating action based on a comparison between the first set of information and the second set of information, and a correlation between the first set of information and the set of field strength measurements, wherein the mitigating action includes:

transmitting an indication to a network entity based on the comparison, receiving channel state information reference signals (CSI-RSs) from the network entity at an increased periodicity in response to the indication, and performing a beam training procedure based on the CSI-RSs.

2. The method of claim 1, wherein the software application is triggered to run by one of:

the network entity; or a configured protocol on the UE for generating autonomous reports to the network entity.

3. The method of claim 1, further comprising:

determining that the first set of information is associated with the hand grip state based on the comparison between the first set of information and the second set of information.

4. The method of claim 1, wherein:

the first set of information comprises at least one of:

a first grip strength measurement;

a first set of finger locations relative to the set of antenna elements;

a first indication of whether a cable is connected to the UE; or a first indication of whether an external accessory is in proximity of the UE, and the second set of information comprises at least one of:

a second grip strength measurement;

a second set of finger locations relative to the set of antenna elements;

a second indication of whether the cable is connected to the UE; or a second indication of whether an external accessory is in proximity of the UE.

5. The method of claim 4, further comprising:

measuring the first set of finger locations and the second set of finger locations with a respective set of at least one of:

frequency-modulated continuous-wave (FMCW) radar measurements; or lidar measurements.

6. The method of claim 1, further comprising:

performing the mitigating action further based on at least one of:

a first set of synchronization signal blocks (SSBs); or serving cell identifying information.

7. The method of claim 1, wherein the mitigating action comprises:

changing one or more beamforming weights for communications as part of the beam training procedure.

8. The method of claim 1, wherein:

the performing the mitigating action is based on an output of a machine learning (ML) algorithm, and the output of the ML algorithm is based at least in part on the first set of information, the second set of information, and the set of field strength measurements.

9. A user equipment (UE), comprising:
one or more memories;
a transceiver; and
one or more processors coupled with the transceiver and the one or more memories storing instructions that are executable by the one or more processors, configured individually or in any combination, to cause the UE to:
perform a training procedure with a software application comprising:
prompting a user to hold a user equipment (UE) in a hand grip state from a set of hand grip states predefined by the software application;
obtaining a first set of information associated with objects surrounding the UE, wherein the first set of information is indicative of the hand grip state; and
obtaining a set of field strength measurements across polarizations and across at least one antenna elements of a set of antenna elements associated with the UE and corresponding to the hand grip state;
obtain, after the training procedure with the software application, a second set of information associated with objects surrounding the UE; and
perform a mitigating action based on a comparison between the first set of information and the second set of information, and a correlation between the first set of information and the set of field strength measurements,
wherein the mitigating action includes:
transmitting an indication to a network entity based on the comparison,
receiving channel state information reference signals (CSI-RSs) from the network entity at an increased periodicity in response to the indication, and
performing a beam training procedure based on the CSI-RSs.

10. The UE of claim 9, wherein the software application is triggered to run by one of:
the network entity; or
a configured protocol on the UE for generating autonomous reports to the network entity.

11. The UE of claim 9, wherein the one or more processors are further configured to cause the UE to:
determine that the first set of information is associated with the hand grip state based on the comparison between the first set of information and the second set of information.

12. The UE of claim 9, wherein:
the first set of information comprises at least one of:
a first grip strength measurement;
a first set of finger locations relative to the set of antenna elements;
a first indication of whether a cable is connected to the UE; or
a first indication of whether an external accessory is in proximity of the UE, and
the second set of information comprises at least one of:
a second grip strength measurement;
a second set of finger locations relative to the set of antenna elements;
a second indication of whether the cable is connected to the UE; or
a second indication of whether an external accessory is in proximity of the UE.

13. The UE of claim 12, wherein the one or more processors are further configured to cause the UE to:
measure the first set of finger locations and the second set of finger locations with a respective set of at least one of:
frequency-modulated continuous-wave (FMCW) radar measurements; or
lidar measurements.

14. The UE of claim 9, wherein the one or more processors are further configured to cause the UE to:
perform the mitigating action further based on at least one of:
a first set of synchronization signal blocks (SSBs); or
serving cell identifying information.

15. The UE of claim 9, wherein the mitigating action comprises:
changing one or more beamforming weights for communications as part of the beam training procedure.

16. The UE of claim 9, wherein:
the performing the mitigating action is based on an output of a machine learning (ML) algorithm, and
the output of the ML algorithm is based at least in part on the first set of information, the second set of information, and the set of field strength measurements.

17. A non-transitory computer-readable medium having program code recorded thereon for execution by a user equipment (UE), the program code comprising:
code for causing the UE to perform a training procedure with a software application comprising:
prompting a user to hold a user equipment (UE) in a hand grip state from a set of hand grip states predefined by the software application;
obtaining a first set of information associated with objects surrounding the UE, wherein the first set of information is indicative of the hand grip state; and
obtaining a set of field strength measurements across polarizations and across at least one antenna element of a set of antenna elements associated with the UE and corresponding to the hand grip state;
code for causing the UE to obtain, after the training procedure with the software application, a second set of information associated with objects surrounding the UE; and
code for causing the UE to perform a mitigating action based on a comparison between the first set of information and the second set of information, and a correlation between the first set of information and the set of field strength measurements,
wherein the mitigating action includes:
transmitting an indication to a network entity based on the comparison,
receiving channel state information reference signals (CSI-RSs) from the network entity at an increased periodicity in response to the indication, and
performing a beam training procedure based on the CSI-RSs.

18. The non-transitory computer-readable medium of claim 17, wherein the mitigating action comprises:
changing beamforming weights based on the beam training procedure.

* * * * *